US005533620A

United States Patent [19]

Torterolo

[11] Patent Number: 5,533,620
[45] Date of Patent: Jul. 9, 1996

[54] FOLDABLE ELEMENT FOR USE IN A CASE HOUSING A ROLL OF PHOTOSENSITIVE MATERIAL

[75] Inventor: Franco Torterolo, Altare, Italy

[73] Assignee: Minnesota Mining and Manufacturing Company, St. Paul, Minn.

[21] Appl. No.: 236,397

[22] Filed: May 2, 1994

[30] Foreign Application Priority Data

May 10, 1993 [EP] European Pat. Off. ............ 93107554

[51] Int. Cl.⁶ .................................................. B65D 85/672
[52] U.S. Cl. ......................... 206/408; 53/473; 206/396; 206/397; 206/455; 206/592; 242/163
[58] Field of Search ................................ 206/413–416, 206/408, 396, 397, 493, 592; 242/118.8, 137.1, 163; 53/473

[56] References Cited

U.S. PATENT DOCUMENTS

| 2,615,564 | 10/1952 | Post .................................. 206/493 X |
| 2,660,296 | 11/1953 | Dunning ................................. 206/396 |
| 3,229,812 | 1/1966 | Metzger ................................. 206/396 |
| 3,319,866 | 5/1967 | Kitchell ............................... 206/408 X |
| 3,401,792 | 9/1968 | Tolaas ................................... 206/396 |
| 4,126,472 | 11/1978 | Sakai et al. . |
| 4,173,483 | 11/1979 | Habu et al. . |
| 4,288,535 | 9/1981 | Kanisawa et al. . |
| 4,336,321 | 6/1982 | Kameda et al. . |
| 4,469,783 | 9/1984 | Kuwabara et al. . |
| 4,621,041 | 11/1986 | Seikawa et al. . |
| 4,725,534 | 2/1988 | Kagami et al. . |
| 4,751,176 | 6/1988 | Pham . |
| 4,828,962 | 5/1989 | Grzeskowiak et al. . |
| 4,842,216 | 6/1989 | Zajac ..................................... 242/163 |
| 5,051,344 | 9/1991 | Kuno . |

FOREIGN PATENT DOCUMENTS

| 0541067 | 5/1993 | European Pat. Off. . |
| 0569857 | 11/1993 | European Pat. Off. . |
| 63-300235 | 12/1988 | Japan . |
| 4-348338 | 12/1992 | Japan . |
| 4-358144 | 12/1992 | Japan . |

*Primary Examiner*—Bryon P. Gehman
*Attorney, Agent, or Firm*—Gary L. Griswold; Walter N. Kirn; Mark A. Litman

[57] ABSTRACT

A foldable element (1) for use in a case (20) for a roll (21) of photosensitive material, in particular for graphic arts films, which can be used to obtain both a support (22) for holding the roll (21) in the case (20) and a spacer (23) for filling free space in the case (20) between the case itself and supports (22). Folding lines (7), two flaps (8, 9) and at least three slits (14, 15, 16) are formed in the element (1), which permit to have a solid structure after bending.

11 Claims, 3 Drawing Sheets

FOLDABLE ELEMENT FOR USE IN A CASE HOUSING A ROLL OF PHOTOSENSITIVE MATERIAL

BACKGROUND OF THE INVENTION

1. Field of the Invention

The present invention relates mainly to a foldable element for use in a case for a roll of photosensitive material, in particular for graphic arts film. The invention relates also to a support means obtained from the foldable element for holding the roll in the case, and to a spacer also obtained from the foldable element for filling free space in the case between the case itself and support elements.

Photosensitive material for professional use such as graphic arts is supplied in the form of rolls, in which a photosensitive film is wound onto a cylindrical core. The roll is protected by an outer wrapping of a light-tight film and by placing it into a case.

Within the case, the roll is supported in a suspended condition because any direct contact against the walls of the case may damage the light-tight wrapping and hence the photosensitive material. Therefore, the roll is supported by two support elements, having a plate with a central protrusion which is inserted into the core.

The diameter of the core and of the roll is standardized, while the length may vary within a certain range. It is not a problem to have cores of many different lengths, but it is expensive to keep stocks of cases of many different diameters.

Therefore, it is normal practice to keep on stock cases of few sizes, and so to place in a case of a certain size rolls having different length. The free space left between one of the support elements and the internal wall of the case is filled with spacers.

The problem at the basis of this invention is to provide an element which can be used both to support the roll and to fill the free space.

This problem is solved, according to the invention, by a foldable element, characterized by comprising a flat base, a folding area dividing the base into a first and a second portions, a first and a second flaps formed in the first and second portions respectively by means of respective first and second cutting lines and first and second folding segments, the first and second folding segments forming angles of 70°–110° and passing through respective first and second reference points symmetrically positioned on the first and second portions with respect to the folding area, a first slit opened in the first flap along a line passing through the first reference point and perpendicular to the first folding segment, a second slit opened in the second flap along a line passing through the second reference point and perpendicular to the second folding segment, a third slit opened in the second portion of the base along a line passing through the second reference point and parallel to the first folding segment, the second and the third slits being adjacent and open one to the other at the second reference point, the first slit intersecting the first cutting line but not the first folding segment, the second slit not intersecting the second cutting line. This element can be used to obtain a support means by bending, along the first folding segment, the first flap by 90° on a side of the base; bending, along the second folding segment, the second flap by 90° on the other side of the base; bending the base by 180° along the folding area while simultaneously inserting the first flap into the second and third slits and matching the first slit around the second flap.

With ther term "inserting" it is meant to act on a flap by moving it into a slit, so that the thickness of the flap is clamped (with or without clearance) by the sidewalls of the slit. With the term "matching" it is meant the reciprocal action, i.e., to act on a slit by moving it towards a flap, so that the thickness of the flap is clamped (with or without clearance) by the sidewalls of the slit.

The same element can be used to obtain a spacer by bending the base by 180° along the folding area, without bending any of the first and second flaps.

It is clear that the first and second reference points are not physical entities but just virtual elements, used to better define the invention. When the foldable element is used to make a support means, the reference points are effectively placed (with a certain approximation) on the axis of the roll to be suspended. Such points are thus preferably in barycentric positions on the respective first and second portions of the base. A different position would be acceptable in respect of protection, but would cause a waste of space inside the case, being the roll cylindrical; besides, an asymmetric position would require extra care in assembling the whole package, in order to place the support means in the right position.

Preferably, the first and second folding segments are perpendicular one to the other, and more preferably equal one to the other, apart from the slits opened therein. This ensures that the protrusion obtained by the two flaps in the support means fits symmetrically the cylindrical core of the roll, because the two flaps are perpendicular one to the other. The roll is fully suspended not only in vertical direction but also in horizontal direction; in the event of shocks or overturning while transporting the case, there is no risk of contact between the roll and the case.

The folding area can be obtained in many different ways. For example, it may consist of a single folding line, or of two parallel folding lines. The former alternative is preferred for its simplicity when the thickness of the material is not too great; for thicker materials, the latter alternative is preferred.

The base can be made of any suitable sheet material. However, it is preferred to make it with cardboard. This material is very cheap, can be easily cut and folded, and has a strength sufficient for the intended use. Moreover, cardboard can be recycled, thus contributing to the protection of the environment. In this respect, it must be noted that also the case can be (and normally is) made of cardboard; therefore, the packaging of the roll may be completely made of the same recyclable material, giving the user the opportunity of easily disposing it in an environmentally friendly way.

Further features and advantages of the invention will be more clearly understood from the following description of a preferred embodiment, shown in the drawings.

Figure 1:
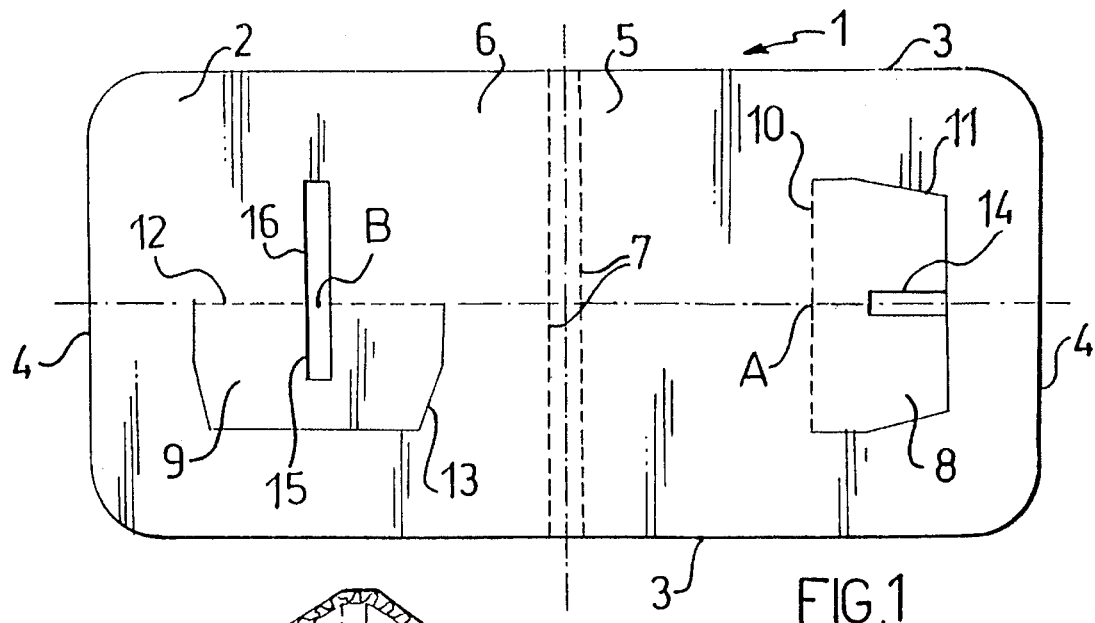
FIG. 1 is a top view of an element according to the invention.

A foldable element 1 comprises a flat base 2, made of corrugated cardboard and having a substantially rectangular shape, with two longer sides 3 and two shorter sides 4.

The base 2 is divided into two portions, a first portion 5 and a second portion 6, by a folding area, which consists of two parallel folding lines 7, extending between the shorter sides 4, in the middle of the longer sides 3. The portions 5 and 6 have the same extension, and are substantially square, the length of longer sides 3 being about twice the length of the shorter sides 4.

Two flaps, a first flap 8 and a second flap 9, are formed in the middle region of the two portions 5 and 6. The first flap 8 is defined by a first folding segment 10 and a first cutting line 11, substantially "C" shaped and having ends in common with the folding segment 10. Similarly, the second flap 9 is defined by a second folding segment 12 and a second cutting line 13, substantially "C" shaped and having ends in common with the folding segment 12.

The positions of the flaps 8 and 9 are better defined by referring to two reference points, a first point A and a second point B, in barycentric positions on the two portions 5 and 6, symmetric with respect to the folding lines 7. The two folding segments 10 and 12 pass through and have middle points in the respective reference points A and B; the angles formed by the two folding segments (i.e., the angles formed by the straight lines to which they belong) are 70° to 110°, preferably—as in the shown example—about 90°. Although not important for their use, it may be preferred that the segments 10 and 12 be parallel to the sides 3 and 4 of the base.

The base 2 further comprises at least three slits.

A first slit 14 is opened in the first flap 8 along a line passing through the first reference point A and perpendicular to the first folding segment 10. This slit 14 extends for a little more than one half of the height (dimension in the sense perpendicular to the respective folding segment 10) of the first flap 8 between the first folding segment 10 and the first cutting line 11, and is adjacent to the cutting line 11.

A second slit 15 is opened in the second flap 9 along a line passing through the second reference point B and perpendicular to the second folding segment 12. This slit 15 extends for a little more than one half of the height (dimension in the sense perpendicular to the respective folding segment 12) of the second flap 9 between the second folding segment 12 and the second cutting line 13, and is adjacent to the folding segment 12.

A third slit 16 is opened in the second portion 6 of the base 2 along a line passing through the second reference point B and parallel to the first folding segment 10. The second slit 15 and the third slit 16 are adjacent and open one to the other at the second reference point B. The extension of the third slit 16 is a little more than half the width (dimension parallel to the respective folding segment) of the first flap 8.

If, as in the shown example, the two flaps 8 and 9 are equal and have a width substantially twice the height, there is no need for further slits. If not, it might become necessary to have a fourth slit opened in the second portion, on the opposite side of the third slit 16 with respect to the flap 9 and in substantial alignment with the slit 16 itself; this fourth slit would receive the possible, extra width of the flap 8.

All slits have a width substantially equal to the thickness of the flat base 2.

The above described foldable element 1 can be used in a case 20 for a roll 21 of photosensitive material, both to make a support means 22 for the roll 21 and to make a spacer 23 for filling free space between the inner walls of the case 20 and the support means 22.

Figure 2:
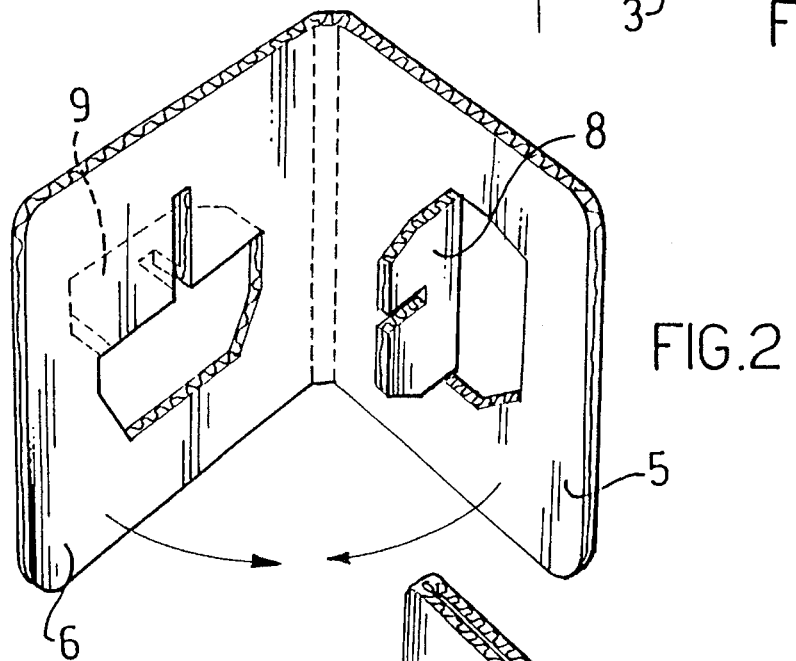
FIG. 2 is a perspective view of the element of FIG. 1 after being folded to obtain a support means.
Figure 3:
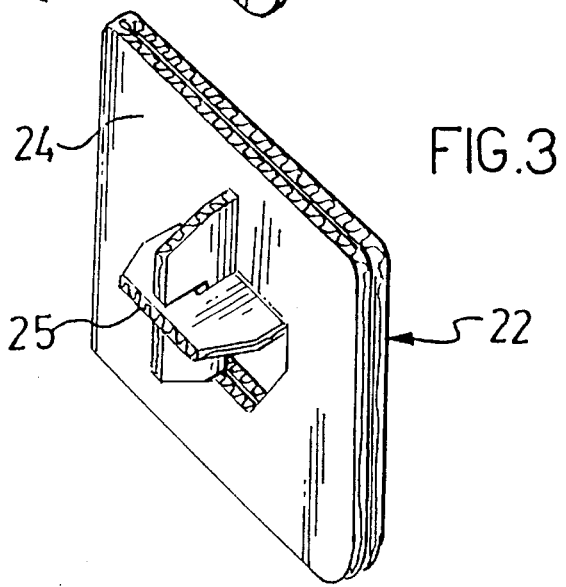
FIG. 3 is a perspective view of the support means obtained by bending the element of FIG. 1.
Figure 4:
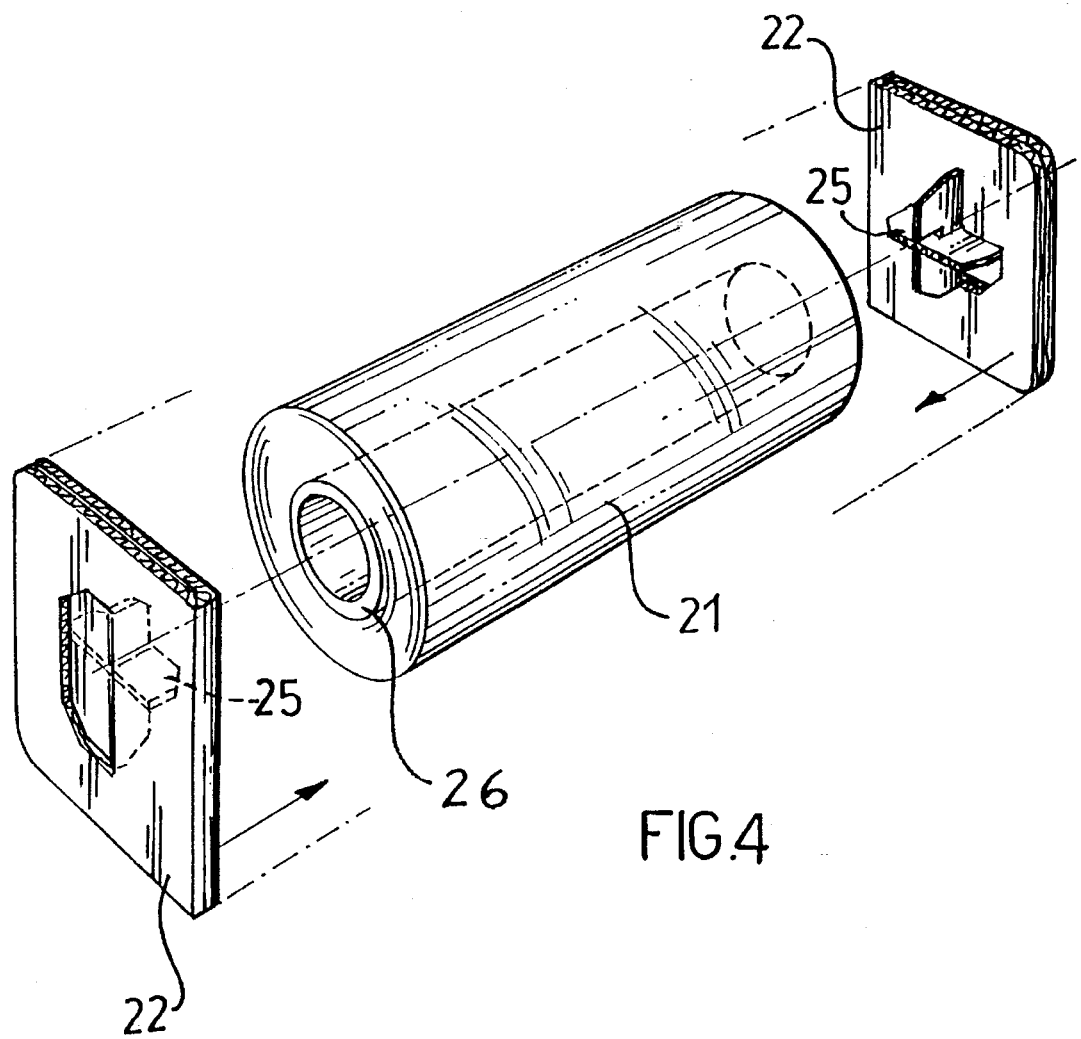
FIG. 4 shows a roll of photosensitive material and two support means for the same, before insertion in a case.
Figure 5:
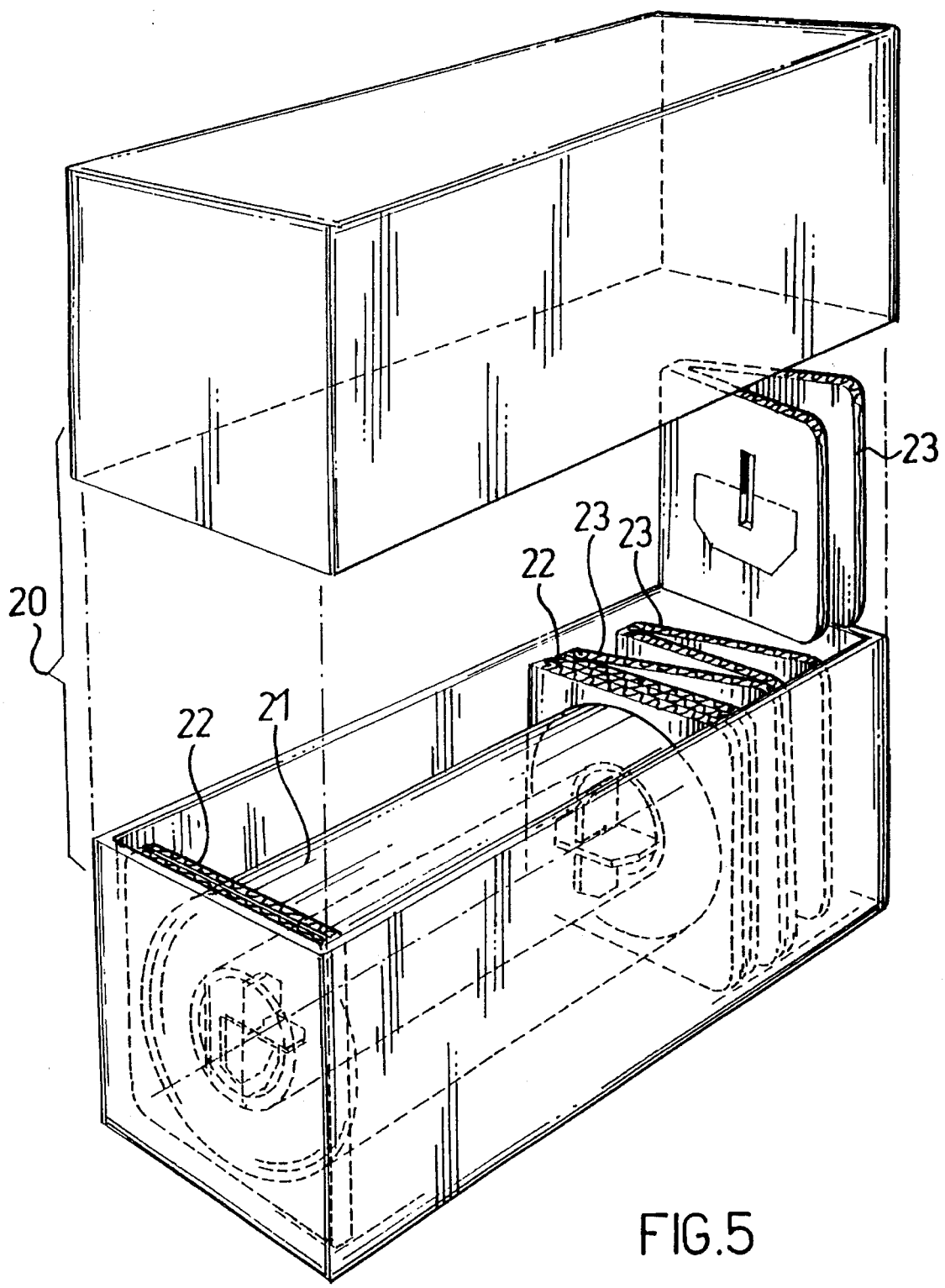
FIG. 5 shows a case including the roll and support means of FIG. 4, during insertion of some spacers obtained by bending the element of FIG. 1.

To obtain a support means 22, the following steps are to be performed. First, the flaps 8 and 9 are bent by 90° along their respective folding segments 10 and 12; the first flap 8 is bent on a side of the base 2, the second flap 9 is bent on the other side. Then, the base 2 is bent by 180° along the folding lines 7 while simultaneously inserting the first flap 8 into the second and third slits 15 and 16 and matching the first slit 14 around the second flap 9. These phases are shown in FIGS. 2 and 3.

The resulting support means 22 has a plate 24, formed by the two superimposed portions 5 and 6 of the base 2, and a central protrusion 25, formed by the two flaps 8 and 9, stuck one to the other. The protrusion 25 fits in a core 26 of the roll 21, while the plate 24 fits in the case 20, thus permitting suspended housing of the roll 21 in the case 20.

The supporting action is very effective, since the mutual intersecting of the flaps 8 and 9 makes the support means 22 particularly strong and resistant.

To obtain a spacer 23, it is sufficient to bend the base 1 by 180° along the folding lines 7, without folding any of the first and second flaps 8 and 9.

As already mentioned, an important advantage is achieved by making the element 1 with cardboard. First, this material is very inexpensive, can be easily cut and folded, and has a strength sufficient for the intended use. But more important is the fact that cardboard can be recycled, thus contributing to the protection of the environment. This contribution is particularly significant if the case 20 is made of cardboard; the user of the photosensitive material, when opening the package, has to dispose of only cardboard elements. Different materials need not be separated to properly dispose them. This possibility should enhance the probability that the user actually takes care of proper disposal, thus permitting recycling.

I claim:

1. A foldable element for use in a case for a roll of photosensitive material, said element characterized by comprising a flat base (2), a folding area defined by folding lines (7) dividing the base (2) into a first portion and a second portion (5, 6), a first flap and a second flap (8, 9) formed in the first and second portions (5, 6) respectively by means of respective first and second cutting lines (11, 13) and first and second folding segments (10, 12), the first and second folding segments (10, 12) forming angles of 70°–110° with each other and passing through respective first and second reference points (A, B) symmetrically positioned on the first and second portions (5, 6) with respect to the folding lines (7), a first slit (14) opened in the first flap (8) along a line passing through the first reference point (A) and perpendicular to the first folding segment (10), a second slit (15) opened in the second flap (9) along a line passing through the second reference point (B) and perpendicular to the second folding segment (12), a third slit (16) opened in the second portion (6) of the base (2) along a line passing through the second reference point (B) and parallel to the first folding segment (10), the second slit and the third slit (15, 16) being adjacent and open one to the other at the second reference point (B), the first slit (14) intersecting the first cutting line (11) but not the first folding segment (10), the second slit (15) not intersecting the second cutting line (13).

2. The foldable element of claim 1, wherein the first and second reference points (A, B) are in barycentric positions on the respective first and second portions (5, 6) of the base (2).

3. The foldable element of claim 1, wherein the first and second folding segments (10, 12) are perpendicular to each other.

4. The foldable element according to claim 1, wherein the first and second flaps (8,9) are equal in size, and are apart from the slits (14, 15, 16) opened therein.

5. The foldable element of claim 1, wherein the folding area consists of a single folding line (7).

6. The foldable element of claim 1, wherein the folding area consists of two parallel folding lines (7).

7. The foldable element of claim 1, wherein the base (2) comprises cardboard.

8. A support means for holding a roll (21) of photosensitive material within a case (20), obtained from a foldable element (1) comprising a flat base (2), a folding area defined by folding lines (7) dividing the base (2) into a first portion and a second portion (5, 6), a first flap and a second flap (8, 9) formed in the first and second portions (5, 6) respectively by means of respective first and second cutting lines (11, 13) and first and second folding segments (10, 12), the first and second folding segments (10, 12) forming angles of 70°–110° with each other and passing through respective first and second reference points (A, B) symmetrically positioned on the first and second portions (5, 6) with respect to the folding lines (7), a first slit (14) opened in the first flap (8) along a line passing through the first reference point (A) and perpendicular to the first folding segment (10), a second slit (15) opened in the second flap (9) along a line passing through the second reference point (B) and perpendicular to the second folding segment (12), a third slit (16) opened in the second portion (6) of the base (2) along a line passing through the second reference point (B) and parallel to the first folding segment (10), the second slit and the third slit (15, 16) being adjacent and open one to the other at the second reference point (B), the first slit (14) intersecting the first cutting line (11) but not the first folding segment (10), the second slit (15) not intersecting the second cutting line (13), the support means obtained by the following steps:

bending, along the first folding segment (10), the first flap (8) on a side of the base (2);

bending, along the second folding segment (12), the second flap on the other side of the base (2);

bending the base (2) along the folding lines (7) while simultaneously inserting the first flap (8) into the second and third slits (15, 16) and matching the first slit (14) around the second flap (9).

9. The support means of claim 8 wherein the bending of the first flap (8) and the bending of the second flap (9) is a bending of 90°, and the bending of the base (2) is by 180°.

10. A process for holding a roll (21) of photosensitive material, in which the photosensitive material is wound onto a cylindrical core (26), within a case (20), which comprises:

a) folding a foldable element (1) comprising a flat base (2), a folding area defined by folding lines (7) dividing the base (2) into a first portion and a second portion (5, 6), a first flap and a second flap (8, 9) formed in the first and second portions (5, 6) respectively by means of respective first and second cutting lines (11, 13) and first and second folding segments (10, 12), the first and second folding segments (10, 12) forming angles of 70°–110° with each other and passing through respective first and second reference points (A, B) symmetrically positioned on the first and second portions (5, 6) with respect to the folding lines (7), a first slit (14) opened in the first flap (8) along a line passing through the first reference point (A) and perpendicular to the first folding segment (10), a second slit (15) opened in the second flap (9) along a line passing through the second reference point (B) and perpendicular to the second folding segment (12), a third slit (16) opened in the second portion (6) of the base (2) along a line passing through the second reference point (B) and parallel to the first folding segment (10), the second slit and the third slit (15, 16) being adjacent and open one to the other at the second reference point (B), the first slit (14) intersecting the first cutting line (11) but not the first folding segment (10), the second slit (15) not intersecting the second cutting line (13), the support means obtained by the following steps:

bending, along the first folding segment (10), the first flap (8) on a side of the base (2);

bending, along the second folding segment (12), the second flap on the other side of the base (2);

bending the base (2) along the folding lines (7) while simultaneously inserting the first flap (8) into the second and third slits (15, 16) and matching the first slit (14) around the second flap (9), to form a roll holding support (22) having a plate (24) and a central protrusion (25);

b) inserting the central protrusion (25) of the roll-holding support (22) into each side of the cylindrical core (26) of the roll (21); and c) inserting the roll (21) into the case (20).

11. A spacer for filling free space in a case (20) for a roll (21) of photosensitive material between the case (20) and roll holding support (22), obtained from a foldable element (1) comprising a flat base (2), a folding area defined by folding lines (7) dividing the base (2) into a first portion and a second portion (5, 6), a first flap and a second flap (8, 9) formed in the first and second portions (5, 6) respectively by means of respective first and second cutting lines (11, 13) and first and second folding segments (10, 12), the first and second folding segments (10, 12) forming angles of 70°–110° with each other and passing through respective first and second reference points (A, B) symmetrically positioned on the first and second portions (5, 6) with respect to the folding lines (7), a first slit (14) opened in the first flap (8) along a line passing through the first reference point (A) and perpendicular to the first folding segment (10), a second slit (15) opened in the second flap (9) along a line passing through the second reference point (B) and perpendicular to the second folding segment (12), a third slit (16) opened in the second portion (6) of the base (2) along a line passing through the second reference point (B) and parallel to the first folding segment (10), the second slit and the third slit (15, 16) being adjacent and open one to the other at the second reference point (B), the first slit (14) intersecting the first cutting line (11) but not the first folding segment (10), the second slit (15) not intersecting the second cutting line (13), by the step of bending the base (2) by 180° along the folding lines (7), without bending any of the first and second flaps (8, 9).

* * * * *